April 18, 1961        E. R. PRICE        2,979,907
DOUBLE BARREL MASTER CYLINDER AND ACTUATING MECHANISM
Filed Oct. 26, 1959
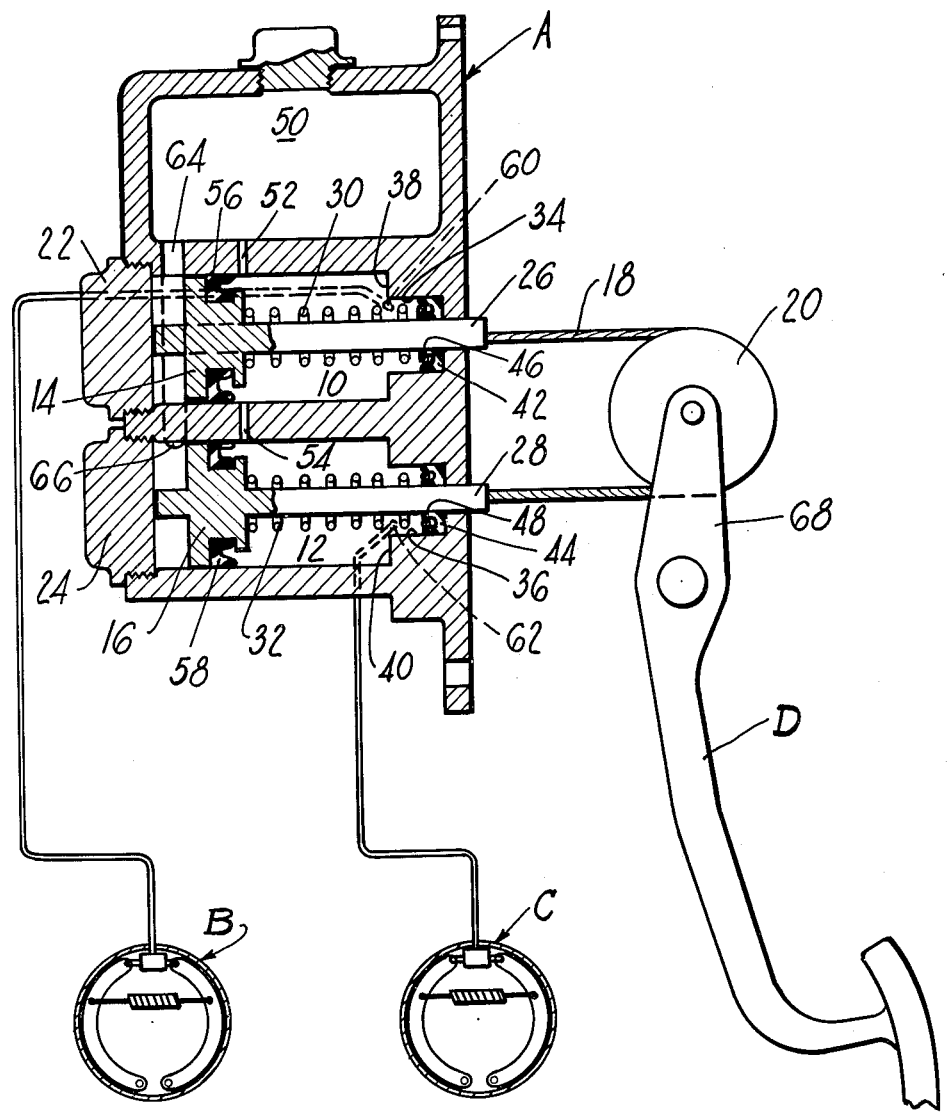
INVENTOR.
EARL R. PRICE
BY
William P. Hickey
ATTORNEY United States Patent Office
2,979,907
Patented Apr. 18, 1961

2,979,907
DOUBLE BARREL MASTER CYLINDER AND ACTUATING MECHANISM

Earl R. Price, South Bend, Ind., assignor to The Bendix Corporation, a corporation of Delaware Filed Oct. 26, 1959, Ser. No. 848,668

5 Claims. (Cl. 60—54.6)

The present invention relates, as indicated, to double barrel master cylinders and actuating mechanisms therefor; and more particularly to a type of simplified design for such mechanisms.

The prior art has heretofore recognized the desirability of having the hydraulic braking system of an automotive vehicle separated into two separate hydraulic systems arranged in such a way that hydraulic failure in one of said systems would still leave the other of the systems intact and operable to brake the vehicle. The prior art first proposed complicated mechanical systems for dividing and applying the force to the displacement pistons in each of the portions; and because of the inadequacy of such mechanical arrangements, most of the more recent systems have proposed a single master cylinder whose discharge pressure is split to in turn actuate separate fluid pressurizing piston which respectively actuate the two separate braking portions of the system. Devices of the latter type generally comprise a master cylinder housing having three fluid pressurizing chambers only one of which is directly actuated by the operator and the discharge of which is exerted against pistons in each of the other two cylinders to stroke these other two pistons in their cylinder bores. The three cylinders have been so proportioned that the manually actuated master cylinder would have a displacement equaling or slightly exceeding the sum of the two other driven pistons; so that during a hydraulic failure in any one of the two driven portions of the system, the secondary actuating piston for that portion would bottom out before the primary master cylinder piston reached its limits of stroke. Continued actuating movement of the primary cylinder's piston may thereafter still actuate the other of the two portions of the braking system. The principal disadvantage of the latter type of system is that a leak of fluid from the primary bore completely disables the braking system.

An object of the present invention is the provision of a new and improved double barrel master cylinder and its actuating mechanism in which only two hydraulic cylinders need be provided, and whose pistons are actuated by a very simple type of mechanical force dividing mechanism.

Another object of the present invention is the provision of a new and improved double barrel master cylinder and actuating mechanism which comprises a minimum of parts combined in such a way as to meet the requirements as to safety and equal force distribution between the braking portions that has been characteristic of the triple barrel master cylinders; and which has been found lacking in the double barrel master cylinders.

The invention resides in certain constructions and combinations and arrangements of parts; and further objects and advantages of the present invention will become apparent to those skilled in the art to which the invention relates from the following description of the preferred embodiments described with reference to the accompanying drawing forming a part of this specification, and in which the solitary figure of the drawing is a somewhat schematic cross sectional view of a split hydraulic braking system that is driven by a double barrel master cylinder and actuating means of a simplified design.

The braking system shown in the drawing generally comprises a cast master cylinder housing A having a pair of fluid pressurizing cylinders 10 and 12 therein—the fluid discharge from which is communicated to the front wheel brakes (only one of which is shown) and to the rear wheel brakes (only one of which is shown) of an automotive vehicle respectively. The mechanism shown is completed by a mechanical force distributing mechanism D that is attached to the fluid displacing movable walls or pistons 14 and 16 in the cylinders 10 and 12 respectively, and by means of which force is equally distributed between the pistons.

According to the principles of the present invention, the fluid pressurizing cylinders or chambers 10 and 12 are so arranged that their pistons 14 and 16 respectively can be pulled by means of a cable to displace fluid from their respective chambers. The cylinders 10 and 12 preferably lie in a common imaginary plane passing through their centers and the above referred to piston actuating cable 18 is looped around a pulley 20 generally positioned in said imaginary plane and preferably located in the region between the longitudinal axes of the respective cylinder chambers 10 and 12. The cylinder chambers 10 and 12 may be arranged vertically or horizontally, and may be positioned in an automotive vehicle with the pulley 20 positioned either towards the front of the vehicle from the master cylinder A, or towards the rear of the vehicle from the master cylinder A. In the embodiment shown in the drawing, it is intended that the master cylinder A will be bolted to the forward or engine compartment side of the vehicle's firewall, and the pulley 20 is positioned rearwardly of the firewall; so that the mechanical force distributing mechanism D is wholly positioned in the driver's compartment of the vehicle beneath the vehicle's dashboard. In those instances where the pulley 20 is to be positioned forwardly of the master cylinder A it will generally be necessary that the master cylinder housing A also be positioned in the driver's compartment beneath the dashboard and generally rearwardly of the pulley 20.

In the embodiment shown in the drawing, the fluid pressurizing chambers 12 and 20 are cast parallel and vertical in the master cylinder housing A with the ends of the respective chambers opening outwardly of the forward end of the housing A. The pistons 14 and 16 are identically sized and shaped; and in the normal or deenergized condition of the braking system, are positioned in the forward end of their respective cylinder chambers where they abut the chamber's end closure members 22 and 44 respectively. Each of the pistons 14 and 16 are provided with a centrally located rod portion 26 and 28 respectively which extends through the rear wall of the master cylinder housing A, and to which the respective ends of the cable 18 are suitably attached. The pistons 14 and 16 are normally biased and held adjacent the forward end of their respective cylinders by means of piston return springs 30 and 32 respectively—one end of which is positioned against the respective piston surrounding the rod portions 26 and 28 respectively, and in the other end of which is positioned in a counterbore 34 and 36 respectively in the rear end wall of the master cylinder housing A. One function of the counterbores 34 and 36 is to provide a shoulder 38 and 40 respectively against which the respective piston can bottom out; and another function of the counterbore is to receive the coils of the respective springs 30 and 32 as actuating movement of the respective pistons force the coils of the springs into the respective counterbores. A suitable cup shaped seal or U-packing 42 and 44 is positioned in the respective counterbores around the piston rod portions 26 and 28; and the U-packings are held in place by means of retaining washers 46 and 48 that are interpositioned between the U-packing and the ends of the respective piston return springs 30 and 32.

Some leakage always occurs in automotive hydraulic braking systems; and in order that fluid can be continually added to replace such loss, a master cylinder reservoir cavity 50 is provided in the master cylinder housing A in the region overlying the pressurizing chambers 10 and 12. Suitable compensating passages 52 and 54 are provided between the reservoir 50 and cylinders 10 and 12 respectively just forwardly of the normal brake releasing position of the pistons 14 and 16 shown in the drawing; so that these compensating passages will be covered up or closed off when the respective pistons are actuated. Each of the pistons 14 and 16 are provided with a U-packing type of seals 56 and 58 respectively which are suitably retained in the outer periphery of the piston. The radially outer lip of the seals 56 and 58 slide over the ends of the communicating passages 52 and 54 respectively to close off the respective passages. Fluid from each of the cylinders 10 and 12 is discharged to the front and rear wheel brakes B and C, respectively, through discharge openings 60 and 62, respectively, which are preferably located in the top of the counterbores 34 and 36 in order that they will not be closed off even though the respective pistons have reached the limit of their stroke. In order that vacuum will not be developed behind each of the pistons, reservoir communicating passages 64 and 66 are provided for the respective chambers 10 and 12 forwardly of their normal brake releasing position shown in the drawing. Openings 60 and 62 will preferably also include a conventional residual pressure check valve (not shown).

Where the cylinder chambers 10 and 12 are arranged horizontally beneath the reservoir 50, it may be feasible in some instances to position the pulley 20 and its actuating brake pedal lever 68 in the common horizontal plane of the cylinder chambers; but in most instances it will be desirable to pin the brake pedal lever 68 for movement in a vertical plane. This can be done, of course, even though the chambers 10 and 12 are positioned in a horizontal plane; but in the preferred embodiment shown in the drawing, the lever 68, pulley 20 and cylinder chambers 10 and 12 all are positioned in a generally common vertical plane. In the embodiment shown in the drawing, the pulley 20 is positioned generally centrally of the chambers 10 and 12 and is pinned to the upper end of the brake pedal lever 68. The lever 68 is pivotally supported between its ends beneath the pulley 20 so that a forward force applied to the bottom end of the lever 68 moves the pulley 20 and the pistons 14 and 16 rearwardly to simultaneously displace fluid into both the front and rear wheel brakes B and C respectively. It will be seen that a hydraulic failure in either of the front or rear wheel braking systems B and C will permit the fluid in its driving chamber 10 or 12, as the case may be, to escape, and its respective piston to bottom out on the shoulders 38 or 40, as the case may be. This will permit the lever 68 to move for approximately ½ of its normal stroke, after which, the end of the cable 18 fixed to the bottomed out piston is held stationary, and further actuation of the lever 68 will only move the other of the two pistons. It will therefore be seen that even though a hydraulic failure occurs in one of the two systems, a continued movement of the brake pedal level 68 will permit the other one of the two systems to be actuated in its normal manner.

While the invention has been described in considerable detail, I do not wish to be limited to the particular constructions shown and described, and it is my intention to cover hereby all novel adaptations, modifications and arrangements thereof which come within the practice of those skilled in the art to which the invention relates and which come within the purview of the following claims.

I claim:

1. A double barrel master cylinder and actuating mechanism comprising: a pair of horizontally extending master cylinders positioned vertically with respect to each other, a pair of pistons, each of which are positioned in a respective one of said cylinders and are arranged to be pulled forwardly to displace fluid from their respective chambers, a vertical lever positioned forwardly of said cylinders and pinned intermediate its ends at a point generally below the lower one of said cylinders, a pulley rotatably mounted on the upper end of said lever, a cable stretched over said pulley with its ends attached to respective ones of said pistons, and stop means for respective pistons limiting their forward movement, and whereby rearwardly directed force applied to the bottom of said lever moves both pistons with equal force until one bottoms out after which continued movement of the lever continues to actuate the other of said pistons.

2. A double barrel master cylinder and actuating mechanism comprising: a pair of generally parallel master cylinders having an imaginary plane passing through the centers thereof, a pair of movable walls, each of which are positioned in a respective one of said cylinders and which displace fluid from said cylinders when pulled in a first endwise direction of said cylinders, a pulley positioned generally in said imaginary plane of said cylinders in said first endwise direction of said cylinders, a cable stretched over said pulley with its ends attached to respective ones of said movable walls, and an actuating lever pivotally connected to a support and to said pulley at spaced points so that rotation about said connection to said support actuates said movable walls to displace fluid from said cylinders.

3. A double barrel master cylinder and actuating mechanism comprising: a pair of generally parallel master cylinders having an imaginary plane passing through the centers thereof, a pair of movable walls, each of which are positioned in a respective one of said cylinders and which displace fluid from said cylinders when pulled in a first endwise direction of said cylinders, a pulley positioned generally in said imaginary plane of said cylinders in said first endwise direction of said cylinders, a cable stretched over said pulley with its ends attached to respective ones of said movable walls, stop means limiting movement of said movable walls in said first endwise direction, and an actuating lever pivotally connected to a support and to said pulley at spaced points so that rotation about said connection to said support actuates said movable walls to displace fluid from said cylinders, and whereby one of said movable walls can be actuated by continued movement of said lever after the other of said movable walls bottoms on said stop means.

4. A double barrel master cylinder and actuating mechanism comprising: a pair of generally parallel master cylinders having an imaginary plane passing through the centers thereof, a pair of movable walls, each of which are positioned in a respective one of said cylinders and which displace fluid from said cylinders when pulled rearwardly of said cylinders, a pulley positioned generally in said imaginary plane of said cylinders between and rearwardly of said cylinders, a cable stretched over said pulley with its ends attached to respective ones of said movable walls, stop means limiting movement of said movable walls in said first endwise direction, and a generally vertical actuating lever positioned rearwardly of said cylinders and pivotally connected to a support and to said pulley at spaced points so that rotation about said connection to said support actuates said movable walls to displace fluid from said cylinders, and whereby one of said movable walls can be actuated by continued movement of said lever after the other of said movable walls bottoms on said stop means.

5. A double barrel master cylinder and actuating mechanism comprising: a pair of generally parallel master cylinders having an imaginary plane passing through the centers thereof, a pair of movable walls, each of which are positioned in a respective one of said cylinders and which displace fluid from said cylinders when pulled rearwardly of said cylinders, a pulley positioned generally in said imaginary plane of said cylinders between and rearwardly of said cylinders, a cable stretched over said pulley with its ends attached to respective ones of said movable walls, stop means limiting rearward movement of said movable walls in said first endwise direction, and a generally vertical actuating lever positioned rearwardly of said cylinders and pivotally connected to a support intermediate its ends and to said pulley at its upper end so that forwardly applied force to the lower end of said lever actuates said movable walls to displace fluid from said cylinders, and whereby one of said movable walls can be actuated by continued movement of said lever after the other of said movable walls bottoms on said stop means.

References Cited in the file of this patent

UNITED STATES PATENTS

| | | |
|---|---|---|
| 2,142,174 | Burrow | Jan. 3, 1939 |
| 2,556,287 | Milster | June 12, 1951 |
| 2,902,121 | Young et al. | Sept. 1, 1959 |

FOREIGN PATENTS

| | | |
|---|---|---|
| 501,556 | France | Jan. 30, 1920 |
| 595,990 | France | July 31, 1925 |
| 839,126 | France | Dec. 26, 1938 |